July 17, 1934. R. WEIS 1,966,775
CAGE FOR ANTIFRICTION BEARINGS
Filed Feb. 2, 1932
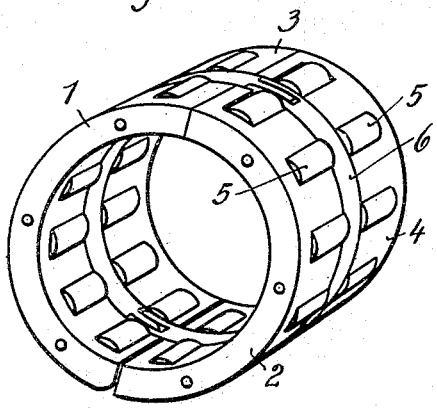
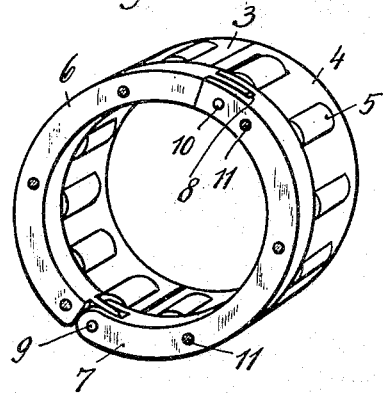
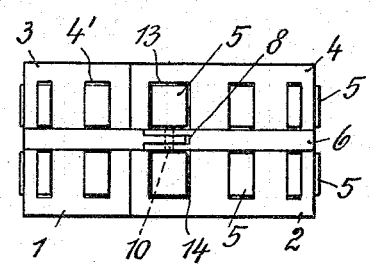
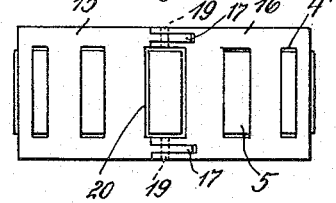
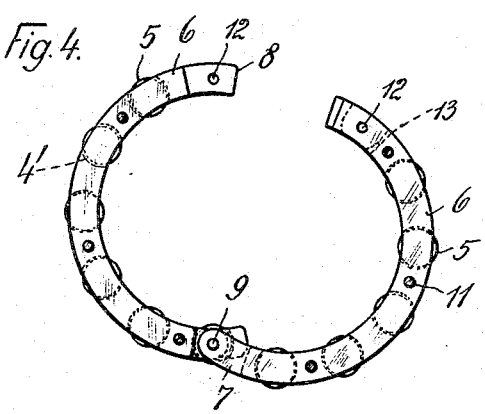
Inventor:
Richard Weis
by Karl Michaelis
Atty.

Patented July 17, 1934

1,966,775

UNITED STATES PATENT OFFICE 1,966,775

CAGE FOR ANTIFRICTION BEARINGS

Richard Weis, Zuffenhausen, Germany

Application February 2, 1932, Serial No. 590,425
In Germany March 8, 1930

5 Claims. (Cl. 308—217)

My invention relates to cages for anti-friction bearings and more particularly to divided cages.

It is an object of my invention to provide a cage of the kind described which in operation is equal to an undivided cage but is readily inserted and removed.

Divided roller cages have already been suggested but my novel cage compares favorably with the old cages by the superior readiness with which it is inserted and removed.

Another advantage is that my novel cage does not possess any laterally projecting parts which might interfere with the supporting means at the sides of the cage. The rollers themselves are supported by their squared end faces in the pockets or recesses of the cage member.

Still another advantage is that the cage prevents the rollers from dropping out while at the same time it is supported by the rollers in such manner that centrifugal action will not cause the parts of the cage to get into contact with the member in which they are housed.

The connection of the cage members is reliable and readily manipulated.

In the drawing affixed to this specification and forming part thereof two roller cages embodying my invention are illustrated diagrammatically by way of example.

In the drawing

Fig. 1 is a perspective illustration of a cage having a pair of divided members, each with a set of rollers, and a hinged intermediate member to which the members of both pairs are connected, Fig. 2 is a perspective illustration showing the pair of members which is shown at the rear in Fig. 2, with the hinged intermediate member, Fig. 3 is a plan view of the complete cage, Fig. 4 is an elevation of the intermediate member in open condition, and Fig. 5 is a plan view of a cage with a single row of rollers and without the intermediate member.

Referring now to the drawing and first to Figs. 1 to 4, 1, 2 and 3, 4 are pairs of semicircular sections, the sections of each pair being arranged to be assembled so as to form a closed ring. They are formed with recesses or pockets 4' for the reception of rollers 5. The rollers project inwardly from the cage and their inwardly projecting portions are guided between shoulders of the inner race (not shown) in the usual manner. The recesses 4' as shown in Fig. 4 are cylindrical so that the rollers 5 cannot escape in radial direction but have some play therein. The two pairs of sections are arranged in parallel with a plain intermediate ring member 6, also formed of two semi-circular sections, inserted between them. The recesses 4' are formed in the outer sections are open in the direction towards the member 6.

The two sections of the intermediate ring member 6 are connected on one side by a hinge 7 and on the other side by a scarfed joint 8. 9 is the hinge pin and 10 is a pin inserted in holes 12, 12 (Fig. 4) of the members of the scarfed joint 8. 11 are pins connecting the cage sections to the intermediate ring member.

Obviously the hinge 7 and the joint 8, instead of being scarfed as shown, might be designed in any other suitable manner.

On either side of the hinge 7 and the joint 8 the cage thus consists of three sections, the two cage sections 1, 3 or 2, 4 and one section of the intermediate ring member 6. The exact machining of the cage is facilitated by this subdivision and the hinge 7 and the joint 8 need be formed only at the intermediate member 6. The several parts of the cage are connected by the hinged pin 9 and the pin 10 at the joint 8. Preferably the hinge and the joint are of similar design which in the present instance is illustrated as an interengaging scarfed joint. When the intermediate member 6 is closed the pin 10 is inserted in the registering holes 12, 12 and at the joint 8. The joint 8 is arranged in line with two recesses 13 and 14 as best seen in Fig. 3, which in contradistinction to the normal recesses 4', are so wide that the rollers 5 can be extracted and reinserted in radial direction. The pin 10 is inserted from one of the recesses 13 or 14 before the corresponding roller 5 is placed in position in the recess, and held in position by the roller. If it is desired to disassemble the cage the two rollers in the recesses 13 and 14 are removed, the pin 10 is extracted and the intermediate member, together with the cage members attached to it by the pins 11, can be opened as shown in Fig. 4.

Obviously a detachable joint (not shown) might be provided instead of the hinge 7 with its pin 9.

Fig. 5 shows a bearing with a single row of rollers 5 in a pair of members 15 and 16 which are connected at one side by a hinge such as 7, or a detachable connection, and by scrafed joints 17 and 18 at opposite sides of the set of rollers, each with a pin 19. The recess 20 which is in line with the joints 17 and 18 is wider than the recesses 4', so that the roller 5 in this recess may be extracted radially for inserting and removing the pins 19, as described with reference to Fig. 3.

I wish it to be understood that I do not desire to be limited to the exact details of construction shown and described, for obvious modifications will occur to a person skilled in the art.

I claim:—

1. A roller bearing comprising two annular cages and solid rollers mounted to rotate in recesses of said cages and having flat end faces, each cage including two halves, a flat intermediate ring member in two sections inserted between and connected with said two cages, means for connecting two adjoining ends of said intermediate ring member, and a scarfed joint formed at the other adjoining ends of said ring member, said recesses being open in the direction toward said ring member.

2. A roller bearing comprising two annular cages and solid rollers mounted to rotate in recesses of said cages and having flat end faces, each cage including two halves, a flat intermediate ring member in two sections inserted between and connected with said two cages, means for connecting two adjoining ends of said intermediate ring member, and a scarfed joint formed at the other adjoining ends of said ring member, said recesses being open in the direction toward said ring member, said joint being arranged in line with one of said recesses, so that the pin of the joint can be removed through this recess.

3. A roller bearing comprising two annular cages and solid rollers mounted to rotate in recesses of said cages and having flat end faces, each cage including two halves, a flat intermediate ring member in two sections inserted between and connected with said two cages, means for connecting two adjoining ends of said intermediate ring member, and a scarfed joint formed at the other adjoining ends of said ring member, said recesses being open in the direction toward said ring member, said joint being arranged in line with one of said recesses, so that the pin of the joint can be removed through this recess, said recesses being formed so as to restrain the rollers in radial direction, with the exception of the recess with which said joint is in line, this recess being formed to allow radial removal of the roller housed therein.

4. A roller bearing comprising in combination, an annular cage in two halves hinged together, recesses in said cage and a roller in each recess, coacting parts of a joint formed at the free ends of said halves, and a pin for connecting said parts arranged for removal through one of said recesses and locked in connecting position by the roller in said recess.

5. A roller bearing comprising in combination, an annular cage in two halves hinged together, recesses in said cage and a roller in each recess, coacting parts of a joint formed at the free ends of said halves, and a pin for connecting said parts arranged for removal through one of said recesses and locked in connecting position by the roller in said recess, this one recess being the only to allow radial removal of the roller located therein.

RICHARD WEIS.